United States Patent [19]

Hurlburt

[11] Patent Number: 4,930,295
[45] Date of Patent: Jun. 5, 1990

[54] HYDRAULIC CYLINDER MODE SHIFT

[75] Inventor: Joseph C. Hurlburt, Lancaster, Pa.

[73] Assignee: Ford New Holland, Inc., New Holland, Pa.

[21] Appl. No.: 377,662

[22] Filed: Jul. 10, 1989

[51] Int. Cl.⁵ ............................................. A01D 69/03
[52] U.S. Cl. ....................................... 56/10.9; 56/11.9
[58] Field of Search ..................... 56/10.1, 10.9, 11.9, 56/14.5, 17.1, 208, 217, DIG. 10, DIG. 11

[56] References Cited

U.S. PATENT DOCUMENTS

| | | | |
|---|---|---|---|
| 4,043,099 | 8/1977 | Cheatum | 56/10.9 |
| 4,059,171 | 11/1977 | Pakosh | 180/775 |
| 4,631,907 | 12/1986 | Zirps | 56/11.9 |
| 4,685,340 | 8/1987 | Shust et al. | 74/11 |
| 4,703,612 | 11/1987 | Webster | 56/11.9 |

Primary Examiner—William P. Neuder
Attorney, Agent, or Firm—Larry W. Miller; Frank A. Seemar; Darrell F. Marquette

[57] ABSTRACT

A crop harvesting machine having mounting arms engageable with a tractor to effect a mounting of the harvester on the tractor is disclosed wherein the hydraulic cylinders used to raise the crop gathering header are double-acting cylinders operable to orient the mounting arms relative to the crop gathering header to facilitate engagement thereof with the tractor. These hydraulic cylinders are converted from double-acting cylinders to single-acting cylinders after the header is mounted on the tractor by disconnection of the hydraulic hose powering a downward movement of the header and the subsequent connection thereof to the return line for the hydraulically driven motor powering operation of the crop gathering header.

7 Claims, 4 Drawing Sheets

HYDRAULIC CYLINDER MODE SHIFT

BACKGROUND OF THE INVENTION

The present invention relates generally to mounted crop harvesting machines having a hydraulically driven crop gathering header and, more particularly, to a means for converting the header lift cylinders from a double-acting mode to a single-acting mode to facilitate a mounting of the implement frame to a tractor.

Mounted harvesting implements, as opposed to pull-type harvesters which are connected to a tractor and towed behind, are affixed to and supported from the tractor to be pushed or pulled into the crop material to be harvested. With the advent of a hydraulically powered, articulated, tractor, such as the Model 276 Bidirectional TM tractor manufactured by Ford New Holland, Inc., harvesting implements can be both mounted and towed for simultaneous operation in the harvesting of the crop material.

Implements have been mounted on such tractors by the engagement of a pair of transversely spaced mounting arms with corresponding support members and attachment brackets affixed to the tractor. Manipulating the orientation of the mounting arms on the harvesting implement for proper alignment with the tractor is a problem which can be resolved with the utilization of double-acting hydraulic cylinders controlling the articulation of the implement frame to vary the orientation of the mounting arms to effect proper alignment with the attachment brackets carried by the tractor. However, double-acting hydraulic cylinders are not conducive to proper operation of the harvesting implement due to flotational characteristics desired for the crop gathering header and the need to prevent hydraulic pressure from driving the crop gathering header into the ground.

SUMMARY OF THE INVENTION

It is an object of this invention to overcome the aforementioned disadvantages of the prior art by providing a hydraulic system for use on a mounted crop harvesting implement in which the header lift cylinders can be converted from double-acting cylinders to single-acting cylinders.

It is another object of this invention to provide a connector in the return line for the hydraulically driven motor providing operation power to the crop gathering header for the selective connection of a hydraulic hose previously connected to the hydraulic cylinder powering the movement of the crop gathering header in a downward position.

It is a feature of this invention that an alternate hydraulic cylinder flow path through the return line for the hydraulically driven motor can be utilized after the harvesting implement is mounted on a tractor and the hydraulic motor is connected to the tractor hydraulic system.

It is an advantage of this invention that double-acting cylinders can be utilized with the articulated frame of the harvesting implement to facilitate mounting thereof on a tractor.

It is another advantage of this invention that the double-acting hydraulic cylinders can be converted into single-acting hydraulic cylinders so that down pressure cannot be exerted on the crop gathering header during operative use thereof.

It is another feature of this invention that the hydraulic lift cylinders can be converted between double-acting and single-acting functions by the relocation of the hydraulic cylinder return flow path through the return line of the hydraulically driven motor.

It is still another object of this invention to provide a means for shifting the double-acting mode of the hydraulic cylinder to a single-acting mode which is durable in construction, inexpensive of manufacture, carefree of maintenance, facile in assemblage, and simple and effective in use.

These and other objects, features, and advantages are accomplished according to the instant invention by providing a crop harvesting machine having mounting arms engageable with a tractor to effect a mounting of the harvester on the tractor wherein the hydraulic cylinders used to raise the crop gathering header are double-acting cylinders operable to orient the mounting arms relative to the crop gathering header to facilitate engagement thereof with the tractor. These hydraulic cylinders are converted from double-acting cylinders to single-acting cylinders after the header is mounted on the tractor by disconnection of the hydraulic hose powering a downward movement of the header and the subsequent connection thereof to the return line for the hydraulically driven motor powering operation of the crop gathering header.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
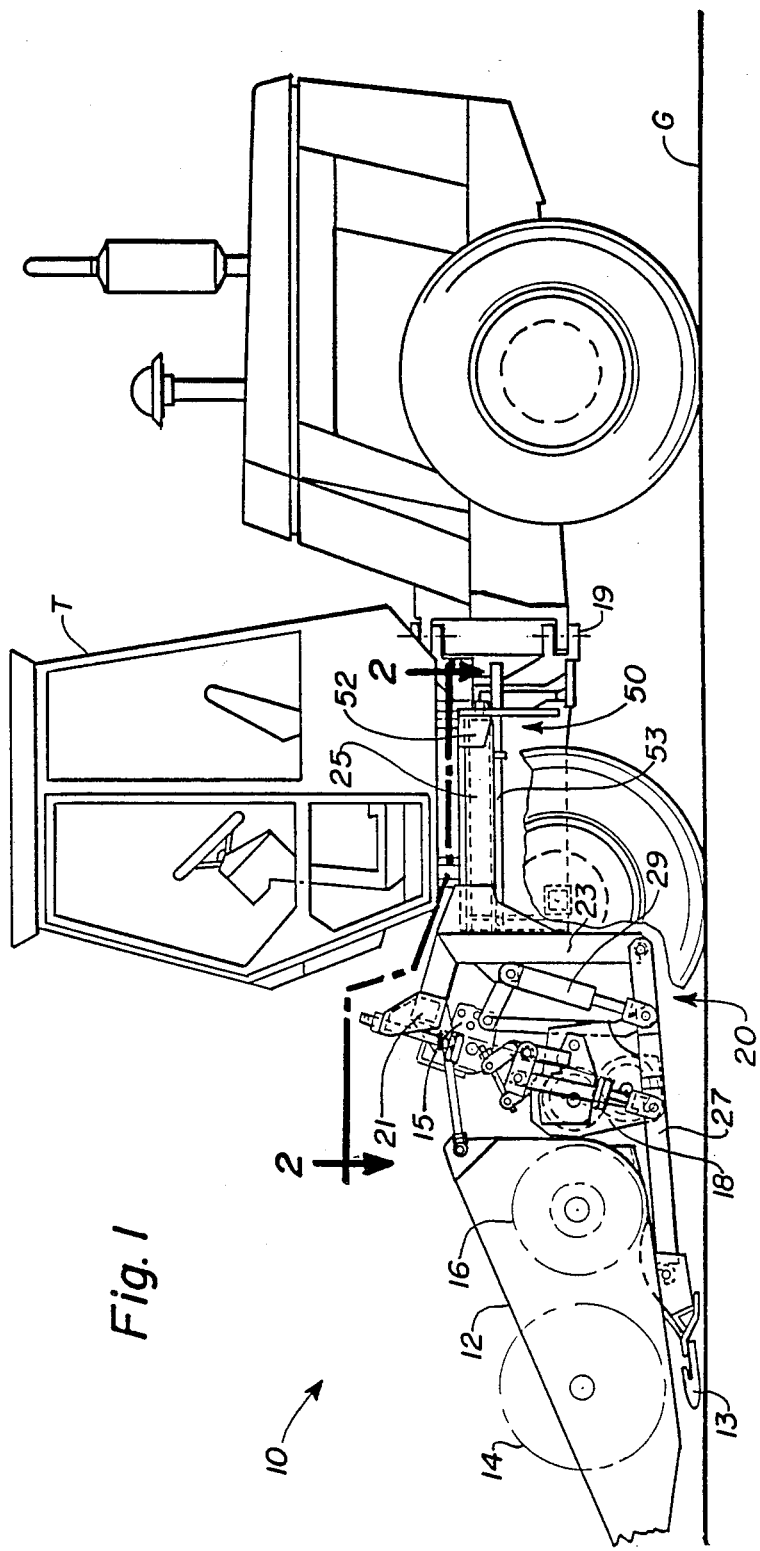
FIG. 1 is a side elevational view of a crop harvesting machine mounted on a tractor, the crop harvesting machine including a crop gathering header powered by a hydraulically driven motor and a hydraulically movable, articulated frame incorporating the principles of the instant invention, portions of the tractor and the crop gathering header being broken away for purposes of clarity.
Figure 2:
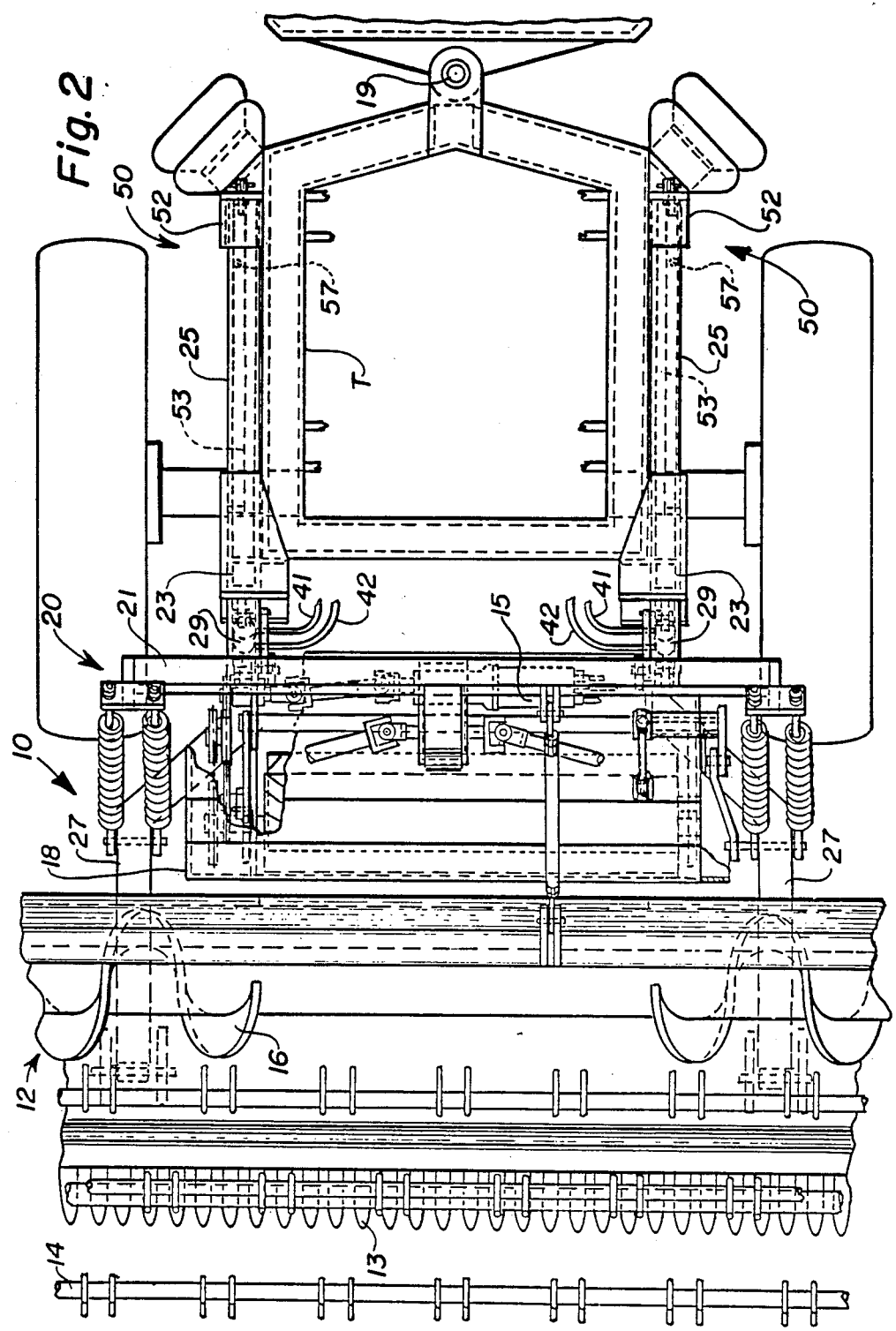
FIG. 2 is a cross-sectional view of the crop harvesting machine taken along lines 2—2 of FIG. 1 to show a top plan view of the crop harvesting machine and the articulated frame with the crop gathering header and conditioning mechanism mounted thereon, a major portion of the tractor and crop gathering header being broken away to facilitate a viewing of the articulated frame.

Referring now to the drawings and, particularly, to FIGS. 1 and 2, side elevational and top plan views of a crop harvesting machine, attached to a prime mover, such as a tractor, incorporating the principles of the instant invention, can best be seen. Any left and right references are used as a matter of convenience and are determined by standing at the rear of the tractor, facing the forward end, the direction of travel. Although the drawings depict the deployment of the crop harvesting machine as an implement to be mounted on the tractor, one skilled in the art will readily realize that the principles of the instant invention will be equally applicable to any implement to be mounted on a tractor for operation in conjunction therewith.

The crop harvesting machine 10 is of the type to be mounted on the forward end of a tractor T to be pushed into the crop material to be harvested. The crop harvesting machine 10 includes a crop gathering header 12 which includes a conventional reciprocating cutterbar 13 to sever standing crop material from the ground G, a rotating reel 14 to convey the severed crop material over the cutterbar 13 and rearwardly therefrom in a conventional manner, and an auger 16 transversely extending along the rear of the crop gathering header 12 to receive severed crop material from the reel 14, converge the crop material and discharge it toward the rearwardly positioned conditioning mechanism 18. A hydraulically driven motor 15 is supported on the header 12 to provide rotational power in a conventional manner to the cutterbar 13, reel 14, auger 16, and the conditioner 18. The crop gathering header 12 and the conditioning mechanism 18 are mounted on an implement frame 20 adapted to be detachably affixed to the tractor T.

The tractor T is shown in the drawings as being the type of tractor described in greater detail in U.S. Pat. No. 4,059,171 and in U.S. Pat. No. 4,685,340, and marketed by Ford New Holland, Inc. as the Model 276 Bidirectional TM tractor. Although this tractor T is hydrostatically driven and steered through manipulation of the articulation joint 19, one skilled in the art will readily realize the principles of the instant invention are not limited by the type of tractor serving as the prime mover; however, the principles of the instant invention do relate to a mounted implement having an articulated frame requiring a double acting hydraulic cylinder to orient the frame of the implement for mounting on the tractor while requiring a single acting hydraulic cylinder for vertically raising the crop gathering header.

The implement frame 20 includes a main transverse beam 21 and a pair of transversely spaced, downwardly depending legs 23. A mounting arm 25 projects rearwardly (relative to the forwardly positioned header 12) from each downwardly depending leg 23. The tractor T carries attachment brackets 50 on opposing sides thereof positioned for engagement with the mounting arms 25 as described in co-pending U.S. patent application entitled "Method and Apparatus for Mounting an Implement to a Tractor", filed concurrently herewith, the descriptive portions of which are incorporated herein by reference. A pair of transversely spaced lift arms 27 are pivotally connected to respective downwardly depending legs 23 and extend forwardly therefrom for support of the header 12. The pivotal movement of the lift arms 27 relative to the legs 23 is controlled by a hydraulic cylinder 29 interconnecting each lift arm 27 and the corresponding leg 23 such that extension and retraction of the hydraulic cylinder 29 pivotally moves the lift arms 27 for generally vertical movement of the header 12 mounted thereon.

Figure 7:
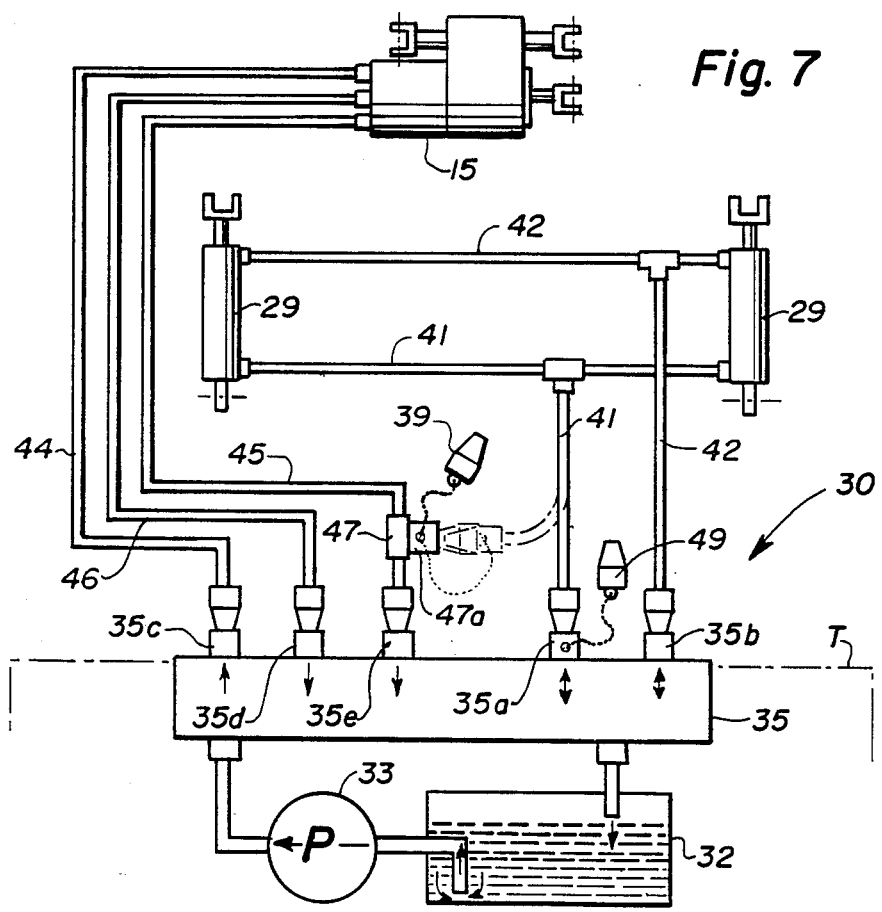
FIG. 7 is a diagramatic view of the hydraulic circuit of the crop harvesting implement connectable to the supply of hydraulic fluid under pressure carried by the tractor.

As best seen in FIG. 7, the hydraulic cylinders 29 are connected to a hydraulic system 30 carried by the tractor T to provide a source of supply of hydraulic fluid under pressure to effect operation of both the hydraulic cylinders 29 and the hydraulically driven motor 15 operable to deliver rotational power to the cutterbar 13, reel 14, auger 16, and conditioning mechanism 18 in a conventional manner. The hydraulic system 30 includes a reservoir 32 containing a supply of hydraulic fluid, a pump 33 to provide a source of hydraulic fluid under pressure to the valve body 35 operable to control the flow of hydraulic fluid under pressure through the system 30 as will be described in greater detail below.

The hydraulic cylinders 29 are connected to the valve body 35 by a first hose 41 and by a second hose 42 associated with the opposing ends of the hydraulic cylinders 29 to supply hydraulic fluid under pressure for extension and retraction thereof. Looking at FIG. 4, 5, and 7, it can be seen that the first hose 41 will deliver a supply of hydraulic fluid under pressure to power an extension of the hydraulic cylinder 29 which will cause an expansion of the articulated frame members 23, 27 which, once the implement 10 is mounted on the tractor T will force a lowering of the header 12 relative to the ground G to an operating position shown in phantom in FIG. 6. Conversely, a supply of hydraulic fluid under pressure through the second hose 42 will power a retraction of the hydraulic cylinder 29 to place the articulated frame 23, 27 into the position shown in FIG. 4 which, once the implement is mounted on the tractor T, will cause a raising of the header to a transport position as shown in solid lines on FIG. 6. Both the first and second hoses 41, 42 are connected to ports 35a, 35b which are controlled in a conventional manner to selectively provide a flow of hydraulic fluid through the respective hoses 41, 42. One skilled in the art will readily realize that if hydraulic fluid is forced through hose 42 to effect a retraction of the hydraulic cylinders 29, hose 41 acts as a return line for the fluid being forced from the opposing end of the hydraulic cylinders 29.

As seen in FIG. 7, the hydraulic motor 15 is connected to the hydraulic system 30 by a pressure line 44 and a return line 45 through ports 35c and 35e in the valve body 35 to provide a unidirectional flow of hydraulic fluid through the hydraulic motor 15 to cause rotation thereof in a given direction to effect an output of rotational power therefrom. The hydraulic motor 15 is also provided with a case drain line 46 to permit the return of hydraulic fluid to the valve body 35 via port 35d and the system 30 after leaking through the hydraulic motor 15 to the outer case thereof as is well known in the prior art. For purposes set forth in greater detail below, the return line 45 is provided with a tee connector 47 which is adapted for connection with the first hose 41. The tee connector 47 is also provided with a cap 49 to close off the port 47a of the tee connector 47 whenever the first hose 41 is not engaged therewith.

Similarly, the port 35a of the valve body 35 is provided with a cap 39 to close off the port 35a whenever the first hose 41 is engaged with the tee connector 47.

Figure 3:
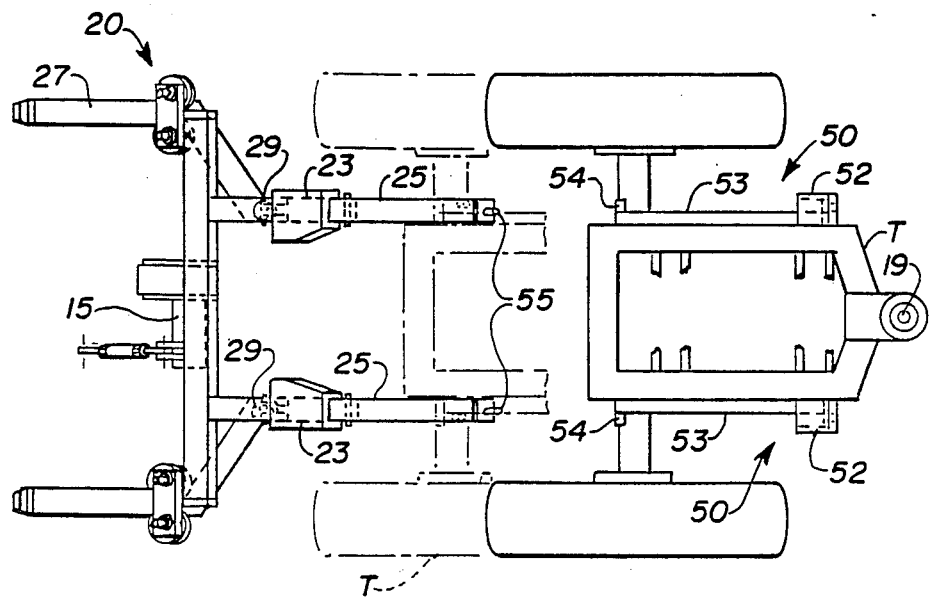
FIG. 3 is a schematic top plan view of the forward portion of the tractor and the implement frame prior to being mounted on the tractor, the movement of the tractor for initial positioning thereof relative to the implement frame being shown in phantom.

As can be seen in FIGS. 1-3, the tractor T is provided with a pair of attachment brackets 50 positioned on opposing sides of the tractor T for engagement with the mounting arms 25 to mount the implement 10 on the tractor T. Each attachment bracket 50 includes a rearward housing 52 and a forwardly extending shelf 53 terminating in a transversely projecting support dowel 54 positioned forwardly of the rearward housing 52. Each mounting arm 25 is provided with a threaded member 55 engageable with the rearward housing 52 to effect a full mounting of the mounting arms 25 with the attachment brackets 50 so that the implement 10 can be fully supported on the tractor T by engagement of the mounting arms 25 with the attachment brackets 50. The structure and operation of the threaded member 55 and the relationship between the mounting arms 25 and the attachment brackets 50 are described in greater detail in the aforementioned co-pending U.S. patent application entitled "Method and Apparatus for Mounting an Implement to a Tractor", filed concurrently herewith.

Figure 4:
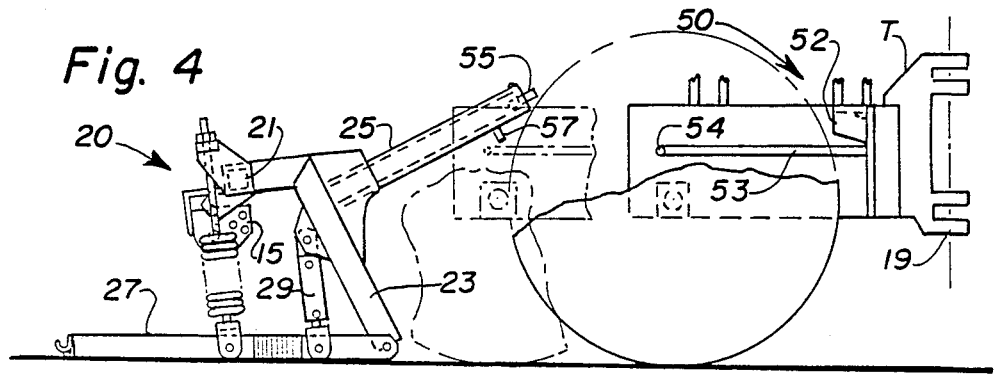
FIG. 4 is a schematic side elevational view of the tractor and implement shown in FIG. 3, the movement of the tractor for initial positioning of the tractor relative to the implement frame being shown in phantom.
Figure 5:
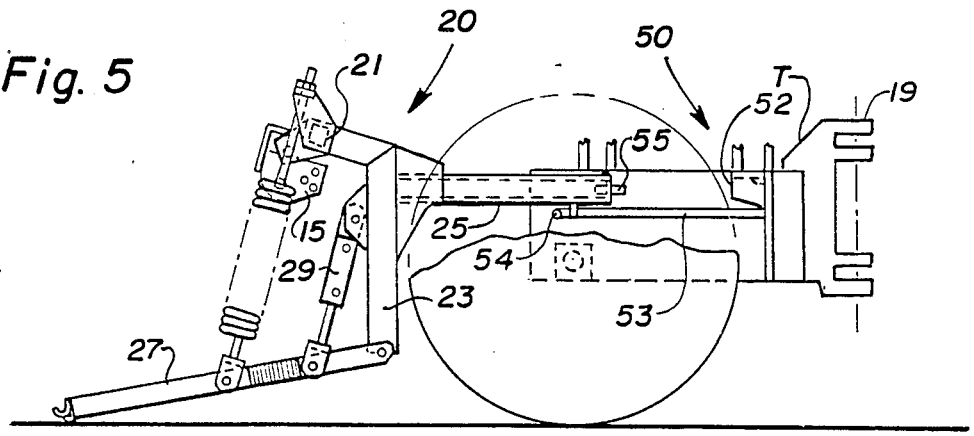
FIG. 5 is a schematic side elevational view similar to that of FIG. 4 showing the engagement of the implement frame with the support member on the tractor prior to moving the tractor forwardly into engagement with the implement frame.

The mounting of the implement 10 on the tractor T can best be seen in FIG. 3-5. The implement 10 is stored in the position depicted in FIGS. 3 and 4 with the hydraulic cylinder 29 completely retracted to collapse the articulation between the lift arms 27 and the downwardly depending legs 23, thereby resulting in the nonhorizontal orientation of the mounting arms 25 extending upwardly and rearwardly from the legs 23. The implement 10 is supported by the lift arms 27 resting upon the ground G when in this stored position. A positioning of the tractor T proximate to the implement frame 20 so that the transversely extending support dowels 54 are located forwardly of the downwardly depending stop members 57 on the mounting arms 25 is depicted in phantom in FIGS. 3 and 4.

After this initial positioning of the tractor T, the first and second hoses 41, 42 for the hydraulic cylinder 29 are operatively connected to ports 35a and 35b of the valve body 35. A manipulation of the valve body 35 to supply hydraulic fluid under pressure through the first hose 41 will effect an extension of the hydraulic cylinder 29 as depicted in FIG. 5, effecting a relative pivotal movement between the lift arms 27 and the downwardly depending legs 23 until the mounting arms 25 reach a generally horizontal position. At this point, the implement frame 20 is supported on the ground G by the lift arms 27 and on the tractor T by the support dowel 54 and perhaps a portion of the forwardly extending shelf 53.

A subsequent movement of the tractor T toward the implement frame 20 causes a movement of the attachment brackets 50 toward the mounting arms 55 until the threaded member 55 is engaged with the rearward housing 52 to permit a full engagement between the mounting arms 25 and the attachment brackets 50. Once the implement 10 has been completely mounted on the tractor T, the operator can disconnect the first hose 41 from the port 35a of the valve body 35 and reconnect the first hose 41 to the port 47a of the tee connector 47 in the return line 45 running between the hydraulic motor 15 and the valve body 35. Once the hose 41a is disconnected from the valve body 35, hydraulic fluid under pressure cannot enter the first hose 41 to effect an extension of the hydraulic cylinders 29. Accordingly, the only powered movement of the hydraulic cylinders 29 can be effected via the supply of hydraulic fluid under pressure through the second hose 42 which will result in a retraction of the hydraulic cylinders 29.

One skilled in the art will readily realize that the displacement of hydraulic fluid from the end of the hydraulic cylinders 29 associated with the first hose 41 will flow into the return line 45 for return thereof to the reservoir 32 with the hydraulic fluid returning from the hydraulic motor 15. Any extension of the hydraulic cylinders 29, which can be caused through gravity as described in greater detail below, will draw hydraulic fluid from the return line 45 to maintain proper displacement of hydraulic fluid in the cylinders 29.

Figure 6:
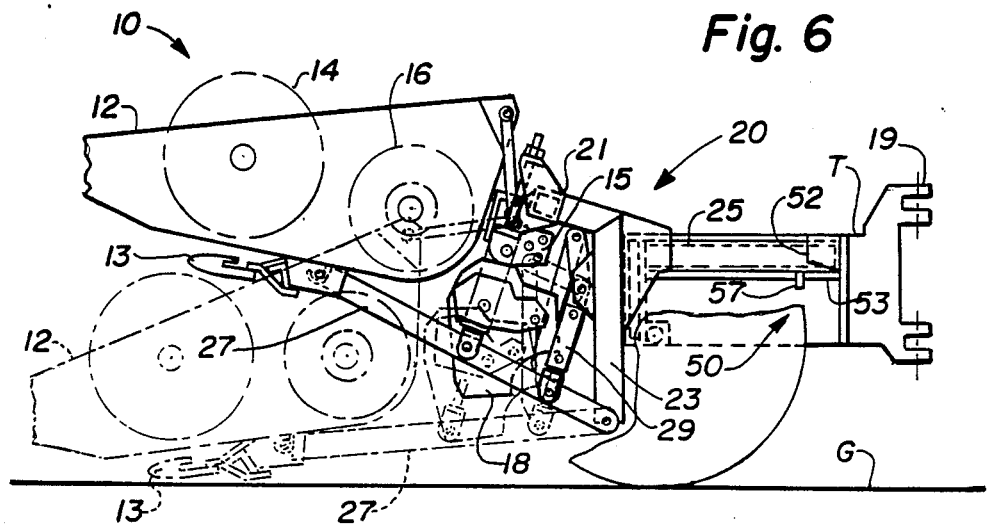
FIG. 6 is a side elevational view of the crop harvesting implement mounted on the tractor with the crop gathering header being raised into an upper transport position, the lower operating position of the crop gathering header being shown in phantom, the major portion of the tractor being broken away for purposes of clarity.

As best seen in FIG. 6, once the implement 10 has been mounted on the tractor T, it is desirable that the hydraulic lift cylinders 29 be utilized only as a single-acting cylinder having only a powered retraction, which causes a lifting of the header 12 relative to the ground G. The return of the header 12 to an operating position shown in phantom in FIG. 6 after having been raised due to a retraction of the hydraulic cylinder 29 can be effected by a reduction of the hydraulic pressure in the second hose 42 so that the weight of the header will force a lowering of the lift arms 27 due to gravitational forces until the header 12 is resting upon the ground G in a normal, conventional operating mode.

Once the operation of the implement is completed and it is desired to dismount the implement 10 from the tractor T, the dismounting of the implement 10 is effected in reverse sequence to that described above for the mounting thereof. A disengagement between the threaded member 55 and the rearward housing 52 will permit the tractor T to be backed away from the implement 12 until the stop member 57 engages the transfer support dowel 54. Because it may be necessary to manipulate the hydraulic cylinders 29 to vary or adjust the orientation of the mounting arms 25 relative to the attachment brackets 50, it may be necessary to disconnect the first hose 41 from the tee connector 47 and the return line 45 and reconnect the first hose 41 to the port 35a of the valve body 35, thereby permitting a powered extension of the hydraulic cylinders 29, as well as a powered retraction of the hydraulic cylinders 29, through the supplying of hydraulic fluid under pressure through the first and second hoses 41, 42, respectively. Once the stop member 57 has engaged the support dowel 54, signaling the operator that rearward motion of the tractor T can be halted, the hydraulic cylinders 29 can be retracted to return the frame 20 of the implement 10 into the stored configuration shown in FIG. 4, following which the hoses 41, 42, 44, 45, and 46 can be disconnected from the valve body 35 and the tractor T turned to further uses.

One skilled in the art will readily realize that the hydraulic cylinders 29 are needed to be a double-acting cylinders only during the mounting and perhaps the dismounting of the implement 10 on the tractor T. However, once the implement 10 has been mounted on the tractor T, the use of the hydraulic cylinders 29 must be restricted to single-acting cylinders so that the header 12 cannot be powered into the ground G. Rather than provide additional cylinders and/or connecting linkages, the instant invention provides a means for converting the hydraulic lift cylinders 29 between single-acting and double-acting modes.

It will be understood that changes in the details, materials, steps, and arrangement of parts which have been described and illustrated to explain the nature of the invention may occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. In a crop harvesting machine mountable on a prime mover having a hydraulic system capable of supplying a source of hydraulic fluid under pressure for operation and movement of said machine over a field to harvest crop material, said crop harvesting machine having an articulated frame; hydraulic cylinder means cooperable with said articulated frame to effect movement thereof for alignment of said frame with said prime mover to facilitate mounting of said crop harvesting machine on said prime mover and to cause a generally vertical movement of at least a portion of said crop harvesting machine once mounted on said prime mover; rotatably driven harvesting components supported on said frame to effect a harvesting of crop material from the field; and a hydraulically powered motor operably connected to said harvesting components to provide rotational power thereto, said motor being connected to said hydraulic system by a pressure line and by a return line for the flow of hydraulic fluid from said hydraulic system to said motor and return thereto, the improvement comprising:

said hydraulic cylinder means having first and second hoses interconnecting said hydraulic cylinder means and said hydraulic system to provide hydraulic fluid under pressure thereto such that said hydraulic cylinder means powers the articulated movement of said frame in both first and second opposing directions; and said return line including a connector having an externally directed port therein to couple said first hose thereto in flow communication with said return line upon disconnection of said first hose from said hydraulic cylinder means following a mounting of said crop harvesting machine on said prime mover, thereby permitting a powering of the movement of said hydraulic cylinder means in only one direction due to the supply of hydraulic fluid under pressure from said hydraulic system to said hydraulic cylinder means only through said second hose.

2. The crop harvesting machine of claim 1 wherein said portion of said crop harvesting machine generally vertically movable once said machine is mounted on said prime mover is a crop gathering header, said second hose providing power for said hydraulic cylinder means to effect a raising of said header, the lowering of said header being effected by the selective reduction of hydraulic pressure in said second hose and by the effect of gravitational forces.

3. The crop harvesting machine of claim 2 wherein said connector is a tee.

4. The crop harvesting mahcine of claim 2 wherein said first hose when connected to said hydraulic cylinder means provides power to move said articulated frame into an orientation used to effect a mounting of said crop-harvesting machine on said prime mover.

5. The crop harvesting machine of claim 4 wherein said articulated frame includes a base frame member and a pair of forwardly extending lift arms pivotally connected to said base frame member, said header being supported on said lift arms for pivotal movement therewith relative to said base frame member, said hydraulic cylinder means interconnecting said lift arms and said base frame member to power the pivotal movement of said lift arms.

6. The crop harvesting machine of claim 5 wherein said hydrualic cylinder means comprises a pair of hydraulic cylinders interconnecting, respectively, said lift arms and said base frame member, said first and second hoses including a tee connection to provide hydraulic fluid under pressure simultaneously to both said hydraulic cylinders.

7. A crop harvesting machine mountable on a prime mover for operative support thereof for the harvesting of crop material from a field, comprising:

a frame including a base frame member, a pair of forwardly extending lift arms pivotally connected to said base frame member, and a pair of mounting arms affixed to said base frame member and engageable with said prime mover for the mounting of said crop harvesting machine thereon;

a crop gathering header mounted on said lift arms to be movable therewith generally vertically relative to the ground;

a pair of double-acting hydraulic cylinders respectively interconnecting said lift arms and said base frame member to control the pivotal movement of said lift arms and said header, said hydraulic cylinders having first and second hoses connected to a supply of hydraulic fluid under pressure to said hydraulic cylinders through said first and second hoses, said fluid supplied through said first hose effecting a pivotal movement of said lift arms resulting in a downward movement of said header, while said fluid supplied through said second hose results in an upward movement of said header; and a hydraulically powered motor operatively connected to said crop harvesting header to provide operational power thereto, said motor having a pressure line and a return line connected to said supply of hydraulic fluid under pressure such that said fluid is selectively supplied to said motor through said pressure line and returned to said supply through said return line, said return line having a tee connection therein for selective connection thereto of said first hose, the supply of hydraulic fluid under pressure through said first hose prior to the mounting of said crop harvesting machine on said prime mover causing a pivotal movement of said base frame member relative to said lift arms to vary the orientation of said mounting arms to facilitate the engagement therewith to said prime mover, said first hose being disconnectable from said hydraulic cylinders and connectable to said tee connection in said return line to convert said hydraulic cylinders into single-acting cylinders operable only to power the upward movement of said header, any downward movement of said header being effected by gravitational forces.

* * * * *